US009983098B2

(12) United States Patent
Santanera et al.

(10) Patent No.: US 9,983,098 B2
(45) Date of Patent: May 29, 2018

(54) DEVICE FOR THE DETECTION OF THE PROFILE OF A ROLLING SURFACE OF A ROLLING BODY, IN PARTICULAR A TREAD OF A TIRE FOR A VEHICLE

(71) Applicant: Tire Profiles Italy S.r.l., Turin (IT)

(72) Inventors: Cesare Santanera, Turin (IT); Marco Riccardi, Turin (IT); Marco Omede', Turin (IT); Giuseppe Zizza, Turin (IT); Angelo Zingarelli, Turin (IT)

(73) Assignee: TIRE PROFILES LLC, Irving, TX (US)

( * ) Notice: Subject to any disclaimer, the term of this patent is extended or adjusted under 35 U.S.C. 154(b) by 457 days.

(21) Appl. No.: 14/526,985

(22) Filed: Oct. 29, 2014

(65) Prior Publication Data
US 2015/0241312 A1 Aug. 27, 2015

(30) Foreign Application Priority Data

Feb. 26, 2014 (IT) .............................. TO2014A0159
Oct. 13, 2014 (EP) .................................. 141886619

(51) Int. Cl.
G01B 11/02 (2006.01)
G01B 11/22 (2006.01)
G06K 7/14 (2006.01)
G01M 17/02 (2006.01)
G01B 11/06 (2006.01)
G01B 11/25 (2006.01)
G01K 7/14 (2006.01)

(52) U.S. Cl.
CPC ....... G01M 17/027 (2013.01); G01B 11/0608 (2013.01); G01B 11/22 (2013.01); G01B 11/25 (2013.01); G01K 7/14 (2013.01)

(58) Field of Classification Search
CPC . G01B 11/02; G01B 11/2433; G01B 11/2522; G01B 11/22; G01B 11/0608;
(Continued)

(56) References Cited

U.S. PATENT DOCUMENTS 5,987,978 A * 11/1999 Whitehead ............. G01B 11/22
73/146
9,651,853 B2 * 5/2017 Arakawa ............... G03B 21/204
(Continued)

FOREIGN PATENT DOCUMENTS

EP  0869330 A2  10/1998
EP  0869330 A3   1/2000
EP  2023078 A1   2/2009

OTHER PUBLICATIONS

Italian Search Report dated Jul. 23, 2014, from corresponding Italian priority application No. TO2014A0159.

Primary Examiner — Randy Gibson
Assistant Examiner — Gedeon M Kidanu
(74) Attorney, Agent, or Firm — Heslin Rothenberg Farley & Mesiti P.C.; Victor Cardona

(57) ABSTRACT

A device for detecting the profile of the rolling surface of a rolling body, in particular a tread of a tire for a vehicle includes a light source and an optical assembly configured for processing a first light beam emitted by the light source. The first light beam is a planar light beam having a divergent course, and the light source is configured for the emission of the first light beam towards the optical assembly. The optical assembly includes at least one first refractive member configured for collimating at least one portion of the first light beam incident thereon into a measurement beam that is directed towards a measurement section of the device to impinge upon the rolling surface.

13 Claims, 5 Drawing Sheets

(58) Field of Classification Search
CPC .. G01B 11/25; G06K 7/10722; G06K 7/1095; G06K 7/14; G01M 17/027; G01M 17/022; G06T 7/0057; G01L 311/0608; G01L 311/22; G01L 311/25; G01L 311/02
USPC .............. 73/146; 356/612, 625; 348/128; 382/286
See application file for complete search history.

(56) References Cited

U.S. PATENT DOCUMENTS

| | | | |
|---|---|---|---|
| 2005/0268707 A1* | 12/2005 | Dale, Jr. | G01M 17/027 73/146 |
| 2008/0218742 A1* | 9/2008 | Sakoda | G01M 17/027 356/73 |
| 2009/0040533 A1* | 2/2009 | Takahashi | G01B 11/2522 356/612 |
| 2010/0128120 A1* | 5/2010 | Garin | G01N 21/9054 348/135 |
| 2010/0225757 A1* | 9/2010 | Li | G01B 11/02 348/128 |
| 2011/0126617 A1* | 6/2011 | Bengoechea Apezteguia | B60C 23/068 73/146 |
| 2011/0182069 A1* | 7/2011 | Dubuc | F21V 5/045 362/235 |

* cited by examiner

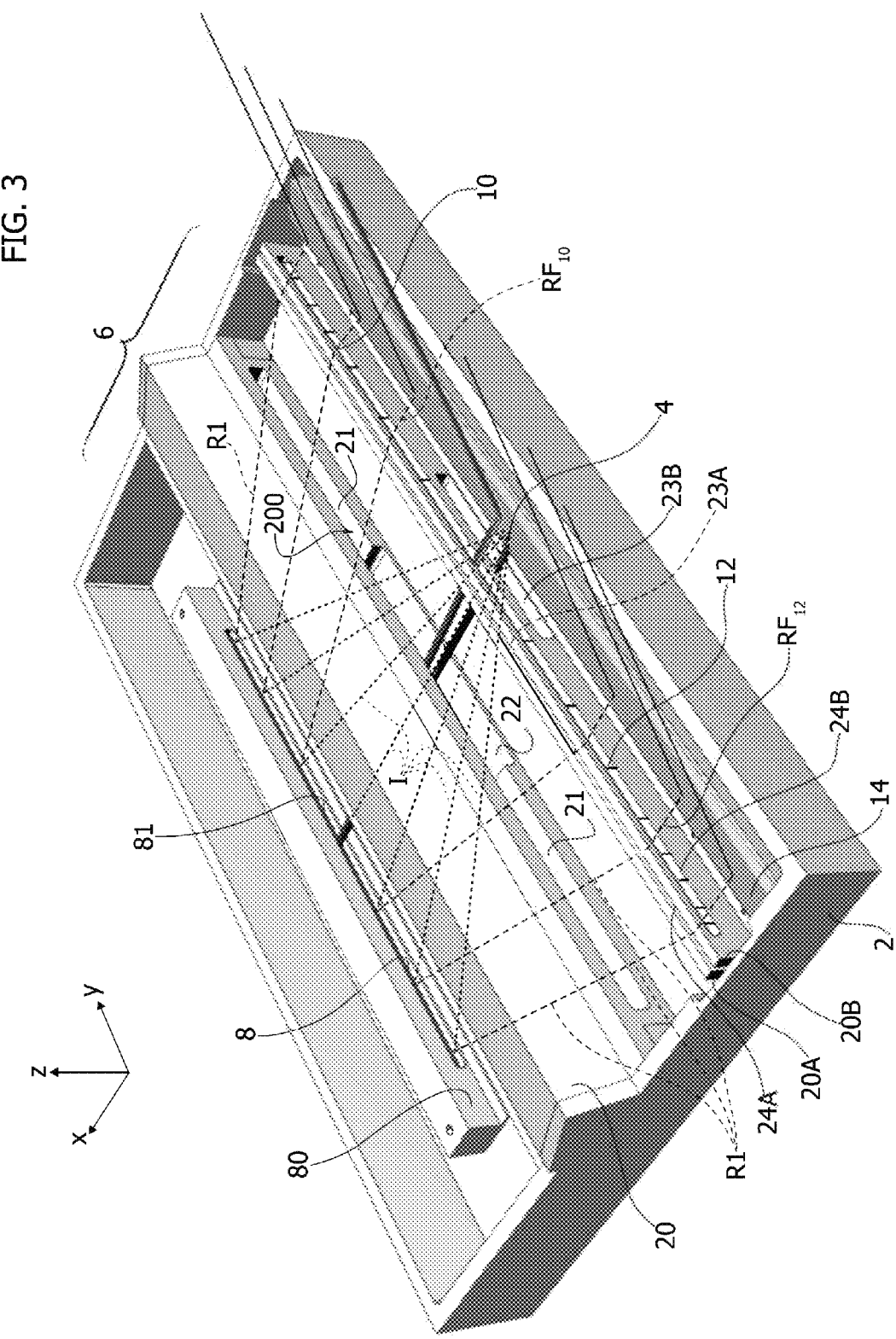

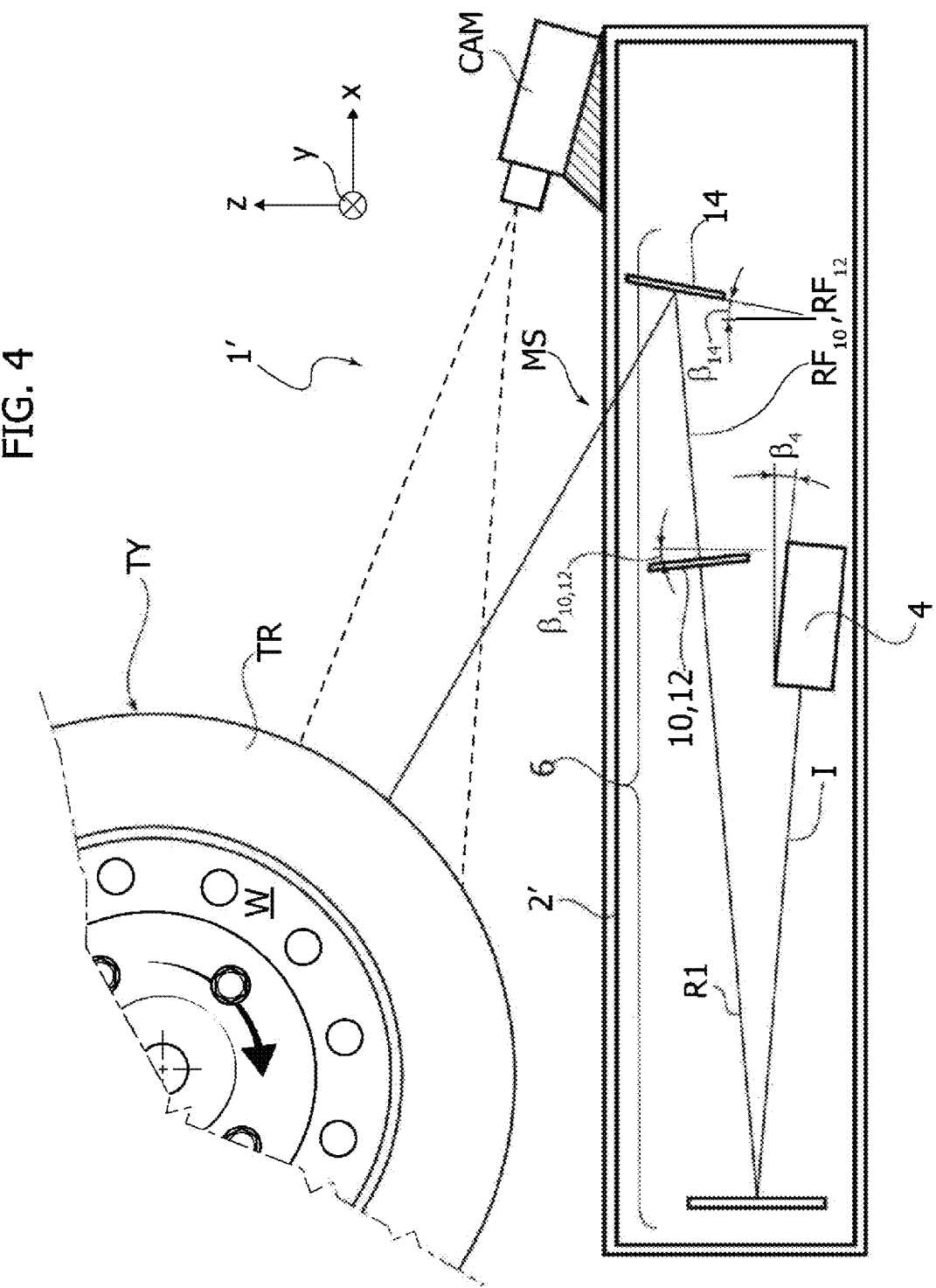

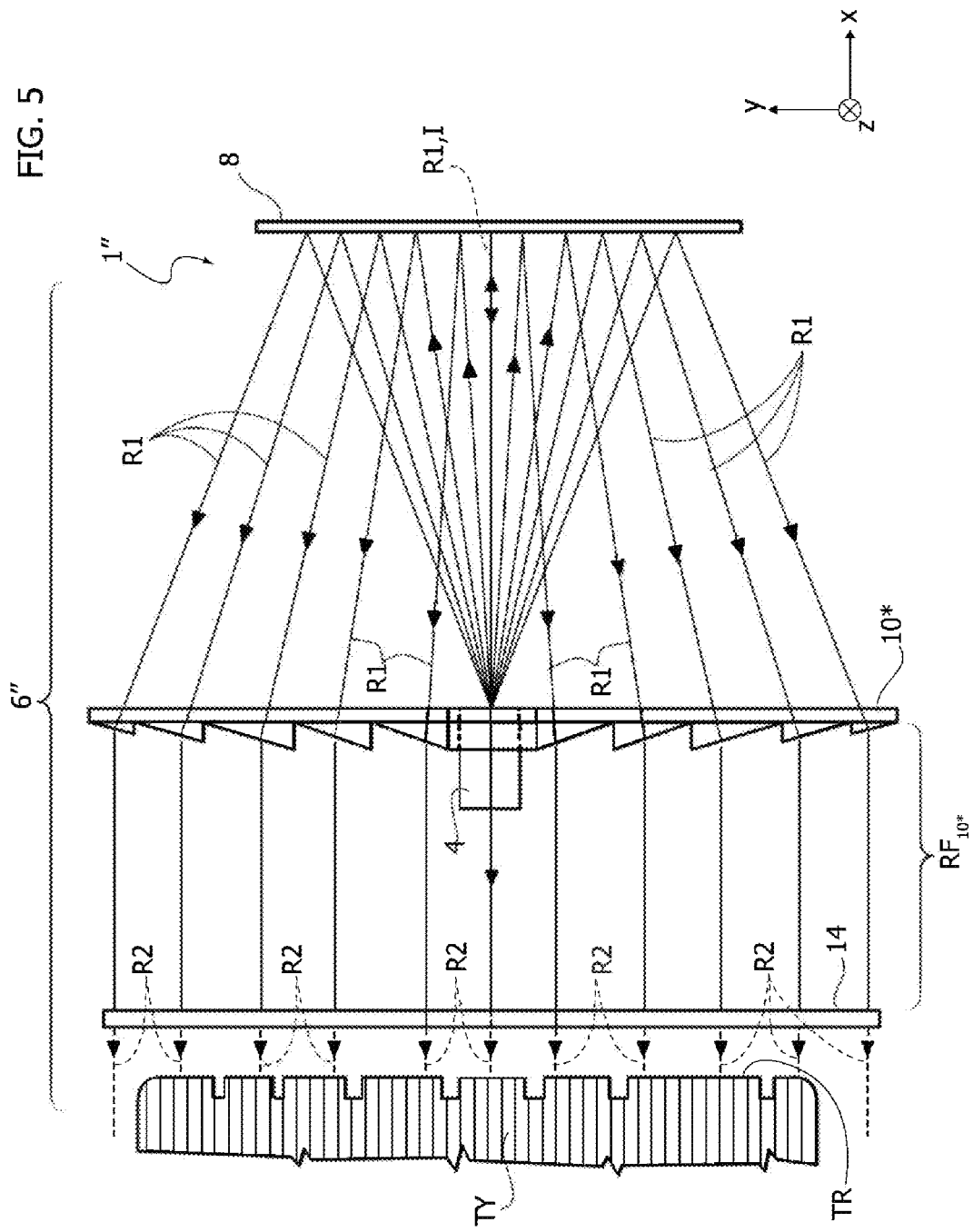

DEVICE FOR THE DETECTION OF THE PROFILE OF A ROLLING SURFACE OF A ROLLING BODY, IN PARTICULAR A TREAD OF A TIRE FOR A VEHICLE

CROSS REFERENCE TO RELATED APPLICATIONS

This application claims priority from Italian Patent Application No. TO 2014 A 000159 filed on Feb. 26, 2014, and European Patent Application No. 141886619.2, filed on Oct. 13, 2014, the entire disclosures of which are incorporated herein by reference.

FIELD OF THE INVENTION

The present invention relates to devices for detecting the profile of a rolling surface of a rolling body, in particular a tread of a tyre for a vehicle. Such devices are used in particular for acquiring indications on the wear that affects the tread of a tyre, as well as the degree of uniformity thereof.

PRIOR ART AND GENERAL TECHNICAL PROBLEM

With reference to the field of application of vehicles rolling on tyres, maintenance of the vehicle in optimal conditions of efficiency requires, among other things, the tread of the tyres to have a residual thickness and a uniformity of wear falling within the limits fixed by current standards.

As is known, an excessively reduced thickness of the tread jeopardizes the driving safety of the vehicle since it markedly reduces the maximum longitudinal and transverse adherence that can be developed by the tyre.

On the other hand, a non-uniform wear of the tyre—even in the case where the residual thickness of the tread is within the limits set down by law—is frequently an index of non-optimal working conditions of the tyre, for example due to a wrong inflating pressure, or of anomalies in the geometry of the suspensions (for example, wrong toe and/or camber angles).

Checking of the state and uniformity of the wear of the tread as a rule requires a complete detection of the profile (in general along the entire circumference of the tread itself) in order to be able to compare it with a reference profile (or with equivalent parameters) associated to normal conditions of wear.

The above operation of detection of the profile may, however, require long times since in many known examples it requires taking the wheel down completely. In other known cases, this operation is performed with very cumbersome and complex equipment that renders normal running and overhaul costs very burdensome.

Among systems for detecting the profile of vehicle tyres, systems of an optical type are known that make use of optical-triangulation laser sensors, which generate a plane beam of laser light that impinges upon the surface of the tyre during rolling of the latter, enabling the image thereof to be acquired.

However, such equipment, which generally presents a construction borrowed wholly or in part from similar equipment in use in other sectors, including the railway sector, is characterized by a certain degree of constructional complexity due to the limited field of observation of optical-triangulation sensors. In other words, they comprise at least one pair of aligned optical-triangulation assemblies (video camera-laser source) so as to detect the entire profile of the tread. One of the major drawbacks linked to the use of these devices lies in the angle with which the laser beam penetrates into the grooves that characterize the radial section of the tread; if the beams of laser light are not orthogonal to the surface of the tyre, they evidently cannot reach the bottom of the grooves since this is orthogonal to the walls of the groove and would consequently be in the shadow with respect to the laser beam.

Furthermore, beyond a certain value of the angle of incidence, no ray reaches the bottom of the grooves. This applies also in the case of a laser light fan orthogonal to the tread: the peripheral rays impinge upon the surface with an angle of incidence that is too large to reach the bottom of the grooves.

For this reason, the equipment for detecting the profile is duplicated and comprises two optical-triangulation sensors, each of which is able to detect partial images (internal and external) of the tyre that are subsequently assembled with techniques per se known.

The system thus comprises a measuring assembly that is at least duplicated (the reason, for this is that frequently more than two assemblies in parallel are necessary) and a system for controlling the above measuring assembly, which is—of necessity—likewise duplicated so as to adapt to the different widths of tread corresponding to the size range of tyres commonly available on the market and mounted on vehicles. This undeniably entails a considerable constructional complexity.

A further disadvantage of the systems constituted by a number of optical-triangulation sensors (laser/video-camera assemblies) is the interaction between them, which must be carefully governed and monitored so that the quality of the measurement does not seriously deteriorate.

OBJECT OF THE INVENTION

The object of the invention is to solve the technical problems mentioned previously.

In particular, the object of the invention is to provide a device for detecting the profile of the rolling surface of a rolling body, in particular a tread of a tyre for a vehicle, that is characterized by a compact, simple, and inexpensive construction and that is able to operate substantially indifferently of the width of the tread of the tyre (or in general of the rolling surface of the rolling body the profile of which is to be detected), without this requiring a duplication of the measurement equipment. A further object of the invention is to eliminate the problems linked to the angle of incidence at which the rays of the measurement beam impinge upon the surface of the tread.

SUMMARY OF THE INVENTION

The object of the invention is achieved by a device for detecting the profile of the rolling surface of a rolling body having the features forming the subject of the appended claims, which form an integral part of the technical disclosure provided herein in relation to the invention.

In particular, the object of the invention is achieved by a device for detecting the profile of the rolling surface of a rolling body, in particular a tread of a tyre for a vehicle, the device including a light source and an optical assembly configured for processing a first light beam emitted by said light source, wherein:
said first light beam is a planar light beam having a divergent course;
said light source is configured for emitting said first light beam towards said optical assembly; and
said optical assembly includes at least one first refractive member configured for collimating at least one portion of said first light beam incident thereon into a measurement beam that is directed towards a measurement section of said device to impinge upon said rolling surface.

BRIEF DESCRIPTION OF THE DRAWINGS

The invention will now be described with reference to the annexed drawings, which are provided purely by way of non-limiting example and wherein:

FIG. 3 is an axonometric view of a specific embodiment of the invention;

FIG. 4 is a schematic view corresponding to that of FIG. 1 but illustrating a variant of the device; and FIG. 5 is a view corresponding to that of FIG. 2, but illustrating yet a further variant of the device.

DETAILED DESCRIPTION OF PREFERRED EMBODIMENTS

Figure 1:
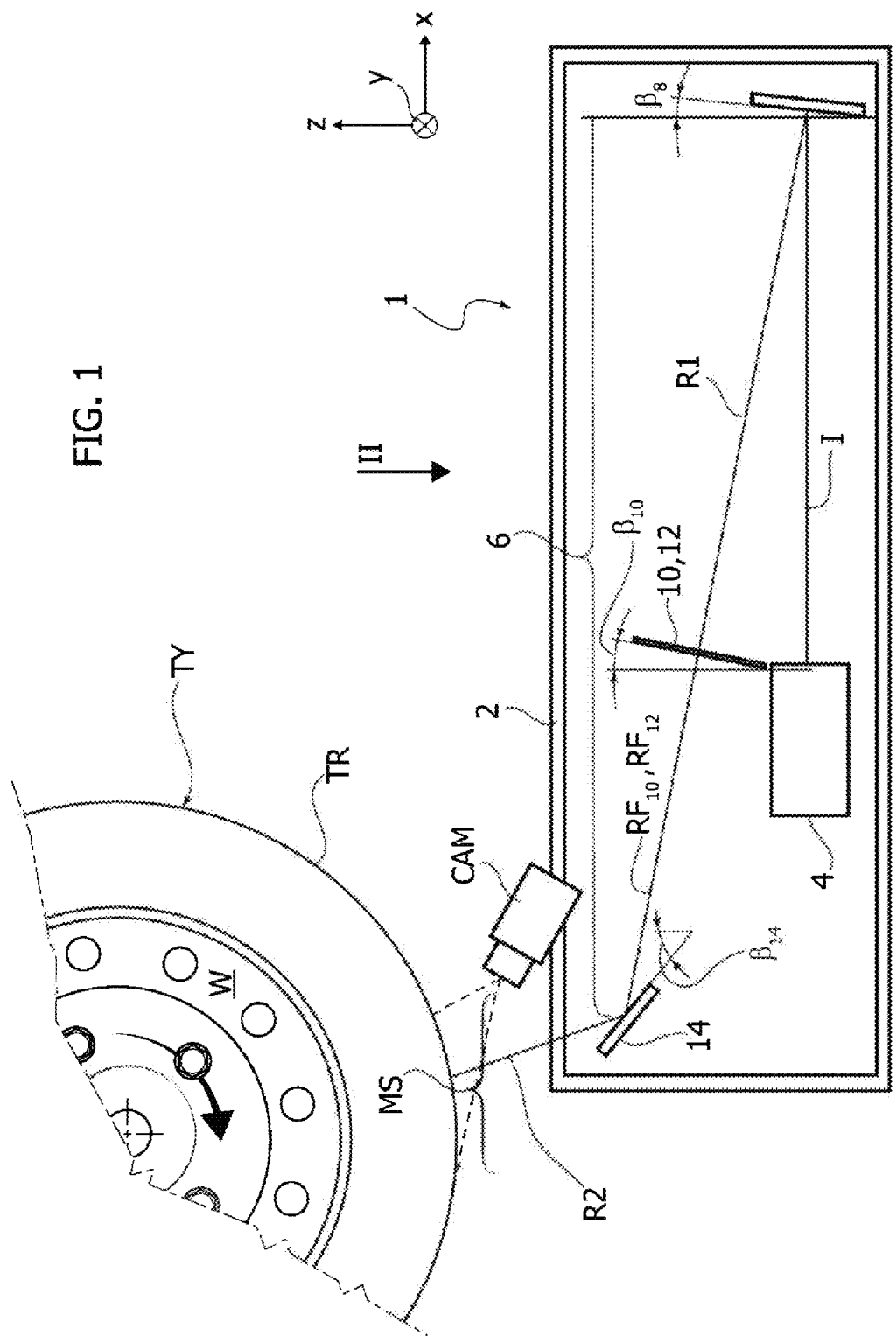
FIG. 1 is a schematic side view of a device according to various preferred embodiments of the invention.
Figure 2:
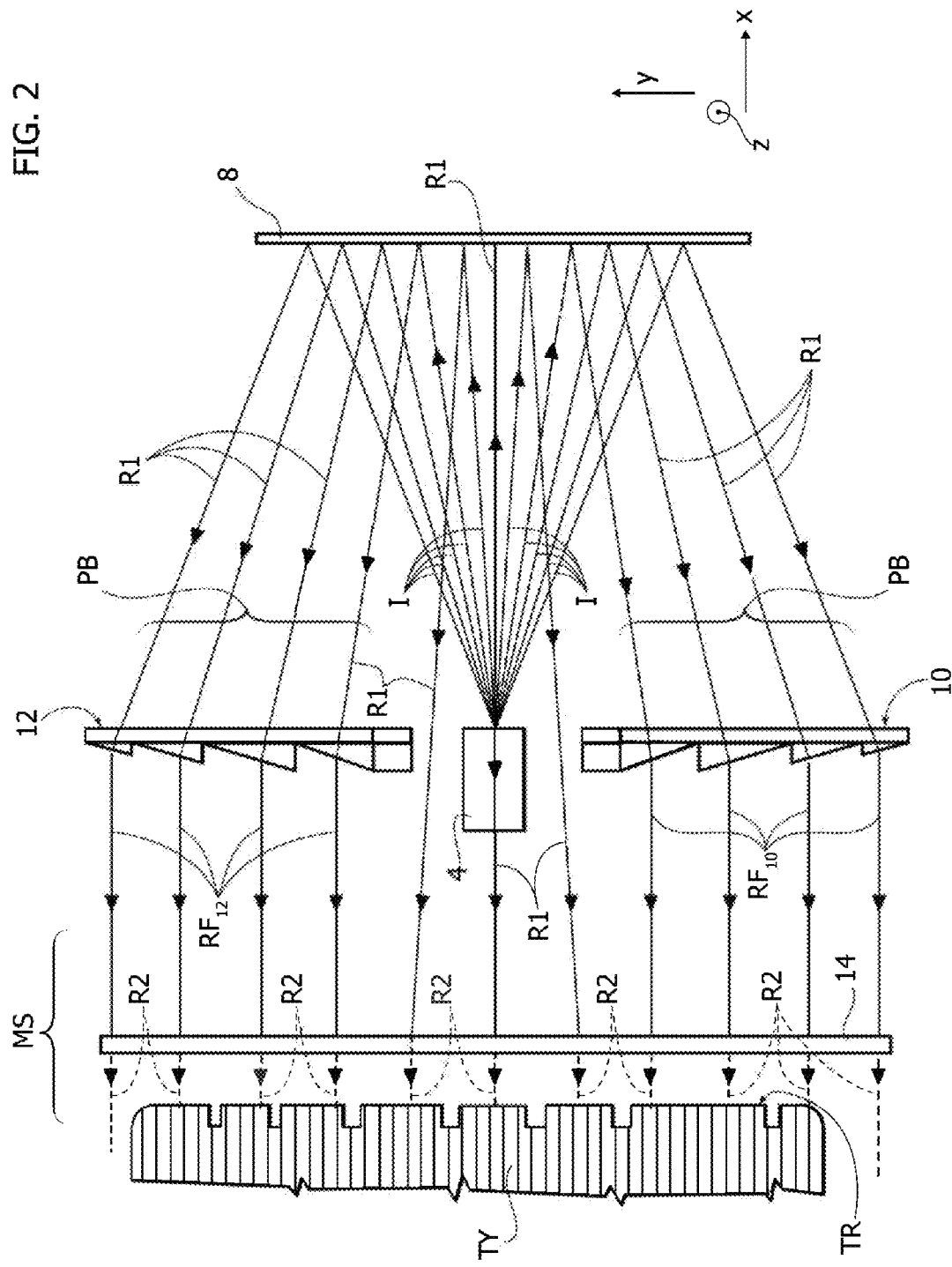
FIG. 2 is a schematic plan view according to the arrow II of FIG. 1.

With reference to FIGS. 1 and 2, the reference number 1 designates a device—according to various embodiments—for detecting the profile of the rolling surface of a rolling body, here in particular a tread TR of a tyre TY for a motor vehicle fitted on a wheel W.

The device 1 includes a casing 2, arranged within which are a light source 4 and an optical assembly 6 configured for processing a light beam emitted by the light source 4. The light source 4 is preferably a laser source.

In greater detail, the optical assembly 6 includes a first reflecting member 8, a first refractive member 10 and a second refractive member 12, and a second reflecting member 14. The latter may in general be considered optional, as will be seen in what follows.

The first reflecting member 8 is preferably made as a plane mirror and is set directly in view of the light source 4. The reflecting member 8 is moreover set inclined by an angle $\beta_8$ with respect to the vertical. For this purpose, reference is made to the set of cartesian axes x, y, z illustrated in FIG. 1 (as in FIGS. 2 and 3), wherein associated to each axis are the following directions of the device 1:

x axis: longitudinal direction;
y axis: transverse direction; and
z axis: vertical direction.

The angle $\beta_8$ has values typically comprised in the range 3° to 30°.

The first and second refractive members 10, 12 preferably consist of two Fresnel lenses set aligned in the transverse direction y and inclined by an angle $\beta_{10}$ with respect to the vertical direction z, where the angle $\beta_{10}$ is generally (for reasons linked to the angle of reflection of the light) twice the angle $\beta_8$ and consequently roughly belongs to the range 6° to 60°. The lenses 10, 12 are arranged on opposite sides with respect to the light source 4, substantially astride thereof.

With reference to FIG. 2, the Fresnel lenses 10, 12 have a markedly elongated geometry in the transverse direction y and, according to an advantageous aspect of the invention, are preferably obtained starting from a single oblong and convergent Fresnel lens of a type commonly available on the market.

In greater detail, the lenses 10, 12 are obtained by cutting a convergent Fresnel lens along the centre line (in a direction orthogonal to the direction of elongation of the lens). As regards the advantages of this arrangement, they will be further described hereinafter.

The second reflecting member 14 is, like the member 8, preferentially made as a plane mirror and is inclined with respect to the vertical (axis z) by an angle $\beta_{14}$ sensibly greater than the angles $\beta_8$, $\beta_{10}$.

Operation of the device 1 is described in what follows.

The light source 4 is configured for emitting a first light beam of a type non-collimated (divergent) in a plane (plane xy in the reference system of the figures) and collimated in an orthogonal plane (plane xz in the reference system of the figures). In other words, it is a blade of light (hence a planar light beam, i.e., a light beam collimated in a plane) with divergent course (i.e., not collimated in the orthogonal plane), known in the art by the name "light fan", which forms a line of light on the objects that it intercepts. This type of light beam may be obtained, for example, by equipping the light source 4 with asymmetrical optics. Preferentially, the source 4 emits laser light, but a different type of light source may also be used, for example a LED source.

The first light beam is designated by the reference I in FIGS. 1, 2 (note that the reference I is applied also to the rays of the beam that are represented in the figures) and impinges upon a front surface of the reflecting member 8, which is here in the form of a plane mirror.

The reflecting member 8 reflects the first beam I into a second light beam designated by the reference R1. The beam R1 is directed towards the Fresnel lenses 10, 12 and is also of a type collimated in a plane and not collimated (divergent) in an orthogonal plane, considering the modalities by which reflection on the plane surface of the mirror 8 occurs. In other words, also the beam R1 can be assimilated to a light fan.

In this connection, note that upon occurrence of the reflection of the first light beam I a progressive and significant increase of the amplitude in the transverse direction of the front of the beam R1 proceeding towards the lenses 10, 12 occurs.

Note moreover that the Fresnel lenses 10, 12 are not capable to intercept the entire width of the front of the beam R1 in so far as they are arranged on opposite sides with respect to the light source 4. This means that the lenses 10, 12 are able to intercept only a corresponding peripheral band PB of the beam R1 (i.e., a marginal region of the beam R1), leaving the portion of the beam R1 that is comprised between them unaltered.

Each Fresnel lens 10, 12 is shaped and configured for collimating the corresponding peripheral band PR of the second light beam R1 towards a measurement section MS of the device 1.

In other words, the divergent rays in the peripheral bands PB of the beam R1 are refracted by the lenses 10, 12 changing the direction thereof and generating in this way two corresponding bands of rays that are substantially parallel (collimated), which are designated by the references $RF_{10}$, $RF_{12}$.

The portion of the beam R1 that traverses the region comprised between the Fresnel lenses 10, 12 does not instead undergo any collimation: this, however, represents an acceptable condition in so far as the light rays in this portion of the beam R1 have an angle of reflection with respect to the surface of the reflecting member 8 very close to 90° owing to the fact that they correspond to reflected rays originating from incident rays that also have an angle of incidence with respect to the member 8 very close to 90°.

Instead, the peripheral bands PB that impinge upon the lenses 10, 12 are constituted by reflected rays of the beam R1 having an angle of reflection that is further away from the value of 90°. This is because they originate from incident rays of the beam I that have angles of incidence that are likewise further away from the value of 90° (with a deviation that increases proceeding towards the periphery of the beam). Note that, with a view to achieving the purpose of the invention, it is desirable for the light rays constituting the measurement beam to have a course as orthogonal as possible to the tread (i.e., they must be as parallel as possible to one another). In the peripheral bands PB optimal conditions would evidently not occur in the absence of a collimation of the beam R1.

This, among other things, is the reason why the refractive members 10, 12 are set substantially in positions corresponding to the sole peripheral bands PB of the beam R1: collimation of the rays in the plane of the beam R1 is strictly necessary only in such areas owing to the values of the angles of reflection that characterize the beam R1. In the area comprised between the lenses 10, 12, the beam R1 includes rays with orientation only slightly shifted from the parallel so that collimation is not strictly necessary. This moreover explains why it is convenient to make the lenses 10, 12 by cutting a single commercial oblong lens along the centre line: the transverse distance that is necessary to cover with this type of application is generally beyond the most common sizes of commercial Fresnel lenses. It would thus be necessary to make lenses that fall outside the ordinary ranges, with a consequent increase in costs, a fact that is evidently not desirable. This, however, does not rule out the possibility of using, should it be necessary, Fresnel lenses of sufficient length (sizes in the 300-mm to 800-mm range). The pair of refractive members 10, 12 can be replaced by a single refractive member: see, in this connection, FIG. 5 and the corresponding portion of description that will be developed in what follows.

By taking advantage of the features of the incident beam I and reflected beam R1, in particular the variation in the angles of incidence and reflection as has just been described, it is possible to cover the extreme areas of the desired transverse length simply by arranging the refractive members 10, 12 (the two sections of the commercial lens) only where they are actually necessary.

The ensemble of the collimated peripheral bands $RF_{10}$, $RF_{12}$ and of the non-collimated central band of the beam R1 comes to constitute a measurement beam consisting in a blade of laser light that is projected out of the device 1 from the measurement section MS.

The section MS is a portion of the device 1 constituting an interface with the surface of the rolling body upon which the aforesaid blade of light impinges and the profile of which, here specifically the tread TR of the tyre TY, is to be detected.

As has been mentioned, provided in this embodiment is a second reflecting member 14, which is preferably configured as a plane mirror and has the function of deflecting the front of the beam downstream of this refractive, members 10, 12 (i.e., the measurement beam) towards the surface whose profile is to be acquired in such a way that the beam impinges upon the surface in a radial way. The deflected beam, is designated in FIGS. 1 and 2 by the reference R2. Collimation of the rays of the beam R1 in the plane has instead the purpose, as has been said, of creating an incidence of the light rays within the plane that is orthogonal to the profile of the tread TR.

The provision of the mirror 14 is a useful measure in the case where the geometry of the optical assembly 6 and in particular the orientation imparted to the measurement beam that is directed towards the measurement section MS—were not to allow the measurement beam to impinge effectively (or were not to allow it to impinge at all) on the surface of the rolling body of which the profile is to be detected.

Typically, if it is desired to maintain a compact construction of the device 1 so as to be able to install it easily in any workshop, the mirror 14 becomes substantially necessary in so far as it is thereby possible to obtain a significant deviation of the measurement beam that enables the tyre TY to be set substantially above the device 1 in a position corresponding to the section MS.

The angle $\beta_{14}$ is for this purpose chosen so as to project the light with radial direction onto the tread in order to allow the light rays of the measurement beam to penetrate into the grooves, reaching the bottom thereof. The angle $\beta_{14}$ is chosen assuming as reference tyre with a diameter occupying a median position in the range of diameters available on the market. This means that on a tyre of markedly different diameter, irrespective of whether it is a larger or smaller diameter, the orientation of the rays of the measurement beam will be practically radial, thus introducing an error in itself negligible, given the values of the effective angle at which the measurement beam comes to impinge upon the tread.

Embodiments are of course possible where the angle of inclination $\beta_8$ of the reflecting member 8 (and consequently the angle $\beta_{10}$) is such that the measurement beam is sent to the measurement section MS already with an optimal inclination.

When the measurement beam impinges upon the tread TR of the tyre TY (which is set in rotation about its own axis, or else passes simply above the device 1, which is the most common application) a trace of laser light is generated that follows the profile of the tread and that is acquired by means of a video-acquisition device (for example, a video camera) designated by the reference CAM, which forms an integral part of the device 1. The video-acquisition device can be installed with different modalities: the only constraint concerns the rigid installation with respect to the light source.

The images acquired by the video-acquisition device CAM are transmitted to an electronic processor that processes them by means of a software (per se known). Hence, downstream, of the processing operation a complete mapping of the profile of the tread TR becomes available, which can be compared with a pre-loaded reference mapping.

From the foregoing there emerges the need for a rigid installation of the video-acquisition device CAM with respect to the source 4. In fact, the shape of the profile generated by the incidence of the measurement beam on the tread TR is extracted from the image framed by the device CAM, and consequently a fixed position thereof with respect to the source 4 is required in order to nave, as a logical consequence, a fixed position with respect to the area of incidence of the measurement beam on the tread TR (i.e., a fixed framing position during acquisition of the images).

FIG. 3 illustrates a preferred and specific embodiment, of the device according to the invention. In FIG. 3, the reference numbers adopted are the same as those already used in the description of FIGS. 1 and 2 and consequently designate the same components.

The frame 2 of the device 1 of FIG. 3 is made as a box-like member within which the light source 4 and the optical assembly 6 are set.

In this embodiment, the optical assembly 6 moreover includes further members that function as support for the reflecting members and refractive members described previously, and moreover as passageway for the light rays emitted by the source 4 and processed by the optical assembly 6.

In greater detail, housed within the frame 2 are a central module 20 and a first plate 20A and a second plate 20B. All the aforesaid members are provided with slits extending in the transverse direction y and configured for allowing passage of the rays of the light beams I and R1.

In particular, the central module 20 includes a transverse slit 200 having two lateral portions 21 and a central portions 22 having a height (measured in the direction z) greater than that of the portions 21.

Each of the plates 20A, 20B further includes a respective bottom transverse slit 23A, 23B and a top longitudinal slit 24A, 24B, respectively, which extend substantially throughout the length of the corresponding plate.

As may be seen in FIG. 3, the sequence of the slits 23B, 23A and of the portion 22 of the slit 200 offers a progressively diverging pathway for the first non-collimated light beam I in its path from the light source 4 to the reflecting member 8.

The sequence of the slit 200 (portions 21, 22, 21) and of the slits 24A, 24B offers, instead, a passageway for the second non-collimated light beam R1 in its travel from the reflecting member 8 to the lenses 10, 12.

Finally, it should be noted that the Fresnel lenses 10, 12 can be accommodated in the longitudinal slits 24A and 24B, thus enabling collimation of the peripheral bands BP of the beam R1 as described previously.

Also the reflecting member 8 is inserted within a casing 80 bearing a longitudinal slit 81, which enables entry of the front of the beam I and incidence thereof on the reflecting member 8.

On the basis of operation of the device 1 described previously, and in particular on the basis of the scheme of FIG. 1f the person skilled in the art will appreciate how the difference of height of the portions of the slits and their possible difference of level is due to the fact that the non-collimated beams of light I, R1 have a path that develops in planes having different geometrical heights.

In particular, the beam I propagates basically in a plane parallel to the plane xy, whilst the beam R1 basically propagates in a plane inclined with respect to the plane xy, i.e., having a geometrical height z greater (and progressively increasing proceeding from the mirror 8 towards the lenses 10, 12) than the plane xy in which the beam I propagates.

From the foregoing description the person skilled in the art will thus appreciate how the device 1 according to the invention is characterized by an extremely compact construction due to the effective exploitation of the reflection of the light emitted by the light source 4 within the device itself, as well as to the use of a non-collimated light (light fan) that enables—in combination with reflection thereof within the optical assembly 6—a measurement beam to be obtained with a front of sufficiently large width, without the need to have available a number of light sources. Note that the provision of reflecting members within the optical assembly 6 enables lengthening of the path of the light rays (consequently increasing the width of the front of the beam), maintaining the compactness of the device, basically due to a "refolding" of the beam I on itself, in particular of the reflected portion HI thereof.

Furthermore, the provision of collimator refraction devices at the peripheral bands of the light beam reflected by the mirror 8 enables maximization of the transverse width of the measurement beam, collimating the beam R1 in the proximity of the measurement section MS and only where necessary for the purpose of pursuing orthogonality of the rays with respect to the profile of the tread, the same measurement beam then being sent towards the section MS itself, with consequent evident advantages in terms of commercial availability and costs of the refractive members 10, 12 that equip the device 1.

Nonetheless, the person skilled in the art will appreciate that, thanks to its compactness, the device 1 can be rendered transportable or self-moving and can be adapted to a plurality of operating contexts to detect the profile of any rolling body, for example the wheel of a railway vehicle, the metal wheel of a large self-moving structure, or the tyre of a lorry, bus or aircraft.

In this connection, FIG. 4 illustrates schematically a variant of the device 1, designated by the reference number 1', which is characterized by a high degree of compactness—in particular in height—due to the arrangement of the components already described inside it. In FIG. 4 the same reference numbers as those of the previous figures are used to designate the same components.

The device 1' includes, within a casing 2' having a height (along the axis z) shorter than the height of the casing 2 of the device 1, the light source 4 and the optical assembly 6. However, unlike the device 1, the light source 4 is set with an inclination $\beta_4$ with respect to the plane xy, while the reflecting member 8 is set parallel to the axis z. The first and second refractive members 10, 12 are arranged on opposite sides with respect to the source 4—along the optical path of the beam R1—and are inclined with respect to the axis z by an angle $\beta_{10}$, $\beta_{12}$ substantially equal to the angle $\beta_4$.

Downstream of the ensemble of the refractive members 10, 12, the measurement beam is directed towards the measurement section MS and directed towards the tread TY via the reflecting member 14, which in this embodiment causes a very marked deviation of the measurement beam. As may be appreciated, the arrangement of the light source and of the members 8 and 10, 12 of the optical assembly 6 is such that the amplification of the transverse dimension (direction y) of the light beam I emitted by the source 4 is obtained by maintaining very limited angles of incidence and reflection in the plane xz, finally delegating to the reflecting member 14 the final deflection of the measurement beam towards the tread TR. The fact of having angles of incidence and reflection in the plane xz with very limited values enables—as a logical consequence—very limited dimensions in height (i.e., along the axis z), to the advantage of compactness and reduction of weight of the device 1'. Operation of the device 1' is of course altogether identical to what has already been described regarding the device 1. Consequently, the functional description provided for the device 1 applies completely to the device 1'.

This means, moreover, that the device is also equipped with a video-acquisition device (for example, a video camera), designated by the reference CAM, installed in a rigid way with respect to the light source 4. In this way, when the measurement beam impinges upon the tread TR of the tyre TY a trace of laser light is generated that follows the profile of the tread and that is acquired by the device CAM.

With reference to FIG. 5, a further variant of the device 1 is designated by the reference number 1". All the components identical to the ones already described are designated by the same reference numbers already adopted previously. The device 1" is identical to the device 1 except for the optical assembly 6", which differs from the optical assembly 6 in the provision of a single, refractive member 10*, preferably obtained as a single Fresnel lens of an elongated shape.

The device 1" consequently carries out a collimation in the plane of the beam R1 of all the light rays, given that it is capable of intercepting the entire front of the beam R1 and not only the peripheral bands PB as occurs for the members 10, 12 in the device 1. The device 1" offers a measuring precision slightly higher than that of the devices 1 and 1' precisely on account of the total collimation of the beam R1. In this way, the measurement beam, that impinges upon the tread of a tyre that is to be measured is constituted entirely by collimated rays, a condition which evidently favours optimal penetration into the grooves of the tread.

The person skilled in the art will appreciate on the other hand than the adoption of an optical assembly wherein a single refractive member 10* designed to cover the entire transverse extension of the beam R1 (more in general the entire transverse extension required for this type of application) is provided, is possible also on the devices 1 (obviously, in so far as by doing so the device 1" would be obtained identically) and 1'. In the latter case, the properties of compactness that characterize the device 1' would be combined with the increased measuring precision that characterizes the device 1". It follows that, depending upon the desired transverse dimensions and upon the commercial availability, it will be possible to use a single refractive member made with a single Fresnel lens or else two refractive members made with a Fresnel lens undersized with respect to the requirements (for reasons of cost and/or availability) and cut into two parts along a centre-line.

Of course, the embodiments and the details of construction may vary with respect to what has been described and illustrated herein purely by way of example, without thereby departing from the scope of the present invention as defined by the annexed claims.

For instance, embodiments are possible wherein also the first reflecting member 8 can be eliminated from the optical assembly 6. In these embodiments, the light source 4 is configured for emitting the first light beam I directly towards the optical assembly 6, within which at least part of the beam I impinges upon the first and second refractive members 10, 12, or alternatively the entire front of the beam I impinges upon the single refractive member 10*. Whatever the number of refractive members provided, they are configured for collimating at least one portion of the light beam I impinging upon, them into a measurement beam that is directed towards the measurement section MS of the device 1 to impinge upon the rolling surface. In this embodiment, it is preferable to equip the light source 4 with asymmetrical optics designed to generate a light fan I having a width as large as possible so as to limit the optical path thereof required, in the absence of the reflecting member 8, to obtain the width of the beam front desired for the measurement beam, the purpose being to contain the longitudinal dimensions of the device.

It should moreover be noted that the functional characterization just provided applies as a matter of fact also to the devices 1, 1' and 1" provided with optical assembly that includes the reflecting member 8: in this case, the beam I comes to impinge upon the one or more, refractive members (whether 10, 12 or 10*) not directly but via its reflection R1. The person skilled in the art will appreciate that the action of the refractive members develops always in the same way, i.e., collimating at least one portion of the light beam (R1 in this case, which is the reflection of the beam I) that impinges upon them, into a measurement beam that is directed towards the measurement section MS of the device 1, 1', 1" to impinge upon the rolling surface.

Of course, the presence or otherwise of the reflecting member 14 is in general altogether independent of the presence (or otherwise) of the reflecting member 8 and of the number of the refractive members of the optical assembly.

What is claimed is:

1. A device for the detection of the profile of a rolling surface of a rolling body, in particular a tread of a tire for a vehicle, the device including:
   a light source, configured to emit a first light beam,
   said first light beam being a planar light beam having a divergent course,
   said light source configured for emitting said first light beam in a first direction towards a first reflecting member and away from a measurement section of the device,
   said first reflecting member being configured for reflecting said first light beam into a second light beam away from said first reflecting member and toward the measurement section of the device and incident upon at least one first refractive member,
   said at least one first refractive member configured for collimating at least one portion of said first light beam incident thereon into a measurement beam that is directed towards a measurement section of said device to impinge upon said rolling surface; and
   said first reflecting member separate from and spaced apart from said at least one refractive member.

2. The device according to claim 1, wherein said optical assembly further includes a second reflecting member configured for reflecting said measurement beam towards said rolling surface.

3. The device according to claim 1, wherein said optical assembly includes a single refractive member.

4. The device according claim 1, wherein said optical assembly includes a reflecting member configured for reflecting said measurement beam towards said rolling surface.

5. The device according to claim 1, further including a video-acquisition device configured for acquiring an image of said measurement beam impinging upon said rolling surface.

6. The device according to claim 1 wherein said optical assembly includes a first refractive member and a second refractive member.

7. The device according to claim 1, wherein said optical assembly includes a single refractive member.

8. The device according claim 1, wherein said optical assembly includes a reflecting member configured for reflecting said measurement beam towards said rolling surface.

9. The device according to claim 1, further including a video-acquisition device configured for acquiring an image of said measurement beam impinging upon said rolling surface.

10. The device according to claim 1 wherein said optical assembly includes a first refractive member and a second refractive member set aligned in the transverse direction.

11. The device according to claim 10, wherein said first and second refractive members are arranged on opposite sides with respect to said light source so as to intercept a respective peripheral band of said second light beam; and
wherein said measurement beam includes said peripheral bands collimated by said first and second refractive members and a portion of said second light beam that traverses an area comprised between said first and second refractive members.

12. The device according to claim 10, wherein said first and second refractive members include a first Fresnel lens and a second Fresnel lens.

13. The device according to claim 12, wherein said first and second Fresnel lenses are made by means of a cut along the centre line of a convergent Fresnel lens having an elongated shape.

\* \* \* \* \*